US008102435B2

(12) United States Patent
Castorina et al.

(10) Patent No.: US 8,102,435 B2
(45) Date of Patent: Jan. 24, 2012

(54) METHOD FOR ACQUIRING A DIGITAL IMAGE WITH A LARGE DYNAMIC RANGE WITH A SENSOR OF LESSER DYNAMIC RANGE

(75) Inventors: Alfio Castorina, Linera (IT); Alessandro Capra, Gravina de Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1063 days.

(21) Appl. No.: 11/857,315

(22) Filed: Sep. 18, 2007

(65) Prior Publication Data
US 2009/0073292 A1      Mar. 19, 2009

(51) Int. Cl.
*H04N 5/228* (2006.01)
*H04N 3/14* (2006.01)

(52) U.S. Cl. ............... 348/222.1; 348/277; 348/294
(58) Field of Classification Search ............ 348/222.1, 348/239, 277, 294
See application file for complete search history.

(56) References Cited

U.S. PATENT DOCUMENTS

| 3,971,065 | A | | 7/1976 | Bayer | 358/41 |
| 6,078,037 | A | | 6/2000 | Booth, Jr. | 250/208.1 |
| 6,175,383 | B1 | * | 1/2001 | Yadid-Pecht et al. | 348/302 |
| 6,665,010 | B1 | * | 12/2003 | Morris et al. | 348/297 |
| 6,831,689 | B2 | * | 12/2004 | Yadid-Pecht | 348/297 |
| 7,791,657 | B2 | * | 9/2010 | Joshi et al. | 348/262 |
| 2004/0036797 | A1 | * | 2/2004 | Stark | 348/362 |
| 2005/0001919 | A1 | * | 1/2005 | Rossi | 348/308 |
| 2007/0210257 | A1 | * | 9/2007 | Masuda et al. | 250/370.09 |
| 2009/0072120 | A1 | * | 3/2009 | McGarry et al. | 250/208.1 |

FOREIGN PATENT DOCUMENTS

| WO | 00/79784 | 12/2000 |
| WO | 01/63914 | 8/2001 |
| WO | 2005/024948 | 3/2005 |

OTHER PUBLICATIONS

Nayar et al., "Adaptive Dynamic Range Imaging: Optical Control of Pixel Exposures Over Space and Time," Proceedings of the Ninth IEEE International Conference on Computer Vision, pp. 1168-1175, Oct. 2003.
Nayar et al., "High Dynamic Range Imaging: Spatially Varying Pixel Exposures," IEEE Conference on Computer Vision and Pattern Recognition, pp. 472-479, Jun. 2000.
Nayar et al., "Assorted Pixels: Multi-sampled Imaging with Structural Models," Proc. of European Conference on Computer Vision, pp. 636-652, 2002.
Reinhard et al., "High Dynamic Range Imaging, Acquisition, Display, and Image Based Lighting," Morgan Kaufmann Publishers, Inc., Nov. 2005, pp. 115-118, 136-139, 187-190, and 206-209.

* cited by examiner

*Primary Examiner* — Hung Lam
(74) *Attorney, Agent, or Firm* — Lisa K. Jorgenson; Robert Iannucci; Seed IP Law Group PLLC

(57) ABSTRACT

A method is provided for obtaining an image with a large dynamic range. An image is acquired such that each image pixel is represented by a plurality of values obtained at the same time but for different integration levels (effective exposures). For each pixel, a representative value is selected among those available, such that it is neither saturated nor blackened.

27 Claims, 14 Drawing Sheets
(6 of 14 Drawing Sheet(s) Filed in Color)

FIG. 14A          FIG. 14B
FIG. 14C

METHOD FOR ACQUIRING A DIGITAL IMAGE WITH A LARGE DYNAMIC RANGE WITH A SENSOR OF LESSER DYNAMIC RANGE

BACKGROUND

1. Technical Field

This invention relates in general to methods for processing digital images. One embodiment is a method of acquiring a digital image of large dynamic range using a sensor of relatively lower dynamic range capability.

2. Description of the Related Art

Image sensors are used in many types of applications of image acquisition. The two main technologies of image sensors are the so-called CCD (Charge Coupled Devices) and the x-y addressable CMOS devices.

These devices are basically composed of a set or array of photo-detectors that convert the incident light in an electric signal representative of the amount of light impinging on the pixel. The array may be read for producing an image based on the detection pattern of the impinging light. The integration time may be controlled through commonly implemented techniques and usually it is the same for all the photo-detectors of the array.

The dynamic range (briefly DR) of a device for image acquisition is the separation between the maximum light intensity that the elementary photo-detectors of the sensor may discriminate without saturating and the minimum light intensity that they are able to sense.

Image sensors, that integrate the electric current generated by impinging photons such as the CMOS devices, have a dynamic range that is limited by the amount of charge that may be discriminately accumulated in correspondence of the image pixels.

Moreover, using a linear digital image acquisition system, the allowed dynamic range is a compromise between the number of bits per pixel and the integration time, as schematically depicted in FIG. 1.

In order to capture the faintest pixels, the exposure time t1 (combination of integration time and gains) may be set to a value that would saturate pixels at a light intensity for example of about ⅓*Imax, wherein Imax is the maximum intensity that can be detected by the sensitive elements of the array before reaching saturation.

The quantization step of the sensed light intensities will be given by the ratio between the intensity ⅓*Imax and the number of gray levels to be discriminated.

Should ⅔*Imax be the intensity that saturates the sensitive elements, for the same number of gray levels the quantization step will be larger (twice the value for the previous case).

The dynamic range changes by varying the exposure time. For a given number of bits per pixel, larger dynamic ranges imply larger quantization errors and increasingly sensitive noise effects in the histogram of intensities relative to darker portions.

Many techniques for extending the dynamic range of linear sensors [1-5] have been developed.

Nayar WO 00/79784 proposed a technique for extending the dynamic range of a linear sensor having a relatively low dynamic range by employing an optical mask over the sensor defining a fixed spatial attenuation pattern, or an array of cells with a controllable spatial attenuation, as shown in FIG. 2.

The acquired image is normalized in terms of the exposure after a calibration phase that corrects the response of the image sensor in combination with the mask and thus is non-linear, as schematically illustrated in FIG. 3. The normalized image is then interpolated for recovering saturated or black pixels.

A largely used technique for generating images substantially without saturated or black pixels is schematically depicted in FIG. 4 and is disclosed in *High Dynamic Range Imaging, Acquisition, Display, and Image-Based Lighting*, authored by Erik Reinhard, Greg Ward, Sumanta Pattanaik, Paul E. Debevec, 29 Nov. 2005, Morgan Kaufmann Publishers Inc.

According to this known technique using a sensor of intrinsically low dynamic range, a plurality of shots of the same scene are taken with different integration times. An image with a high dynamic range is then obtained by combining the pixels of the pictures taken (four in the illustration of FIG. 4). Finally, the intensities of the pixels in the relatively low dynamic range of the sensor are scaled by using a certain compression function.

A problem with this technique is that several shots (pictures) must be taken without moving the photo-camera and the depicted objects/subjects must be still. Under these conditions all the pictures represent exactly the same scene, otherwise it would be very difficult to align them correctly.

The published application WO 01/63914 discloses a method for acquiring an image of large dynamical range using an image sensor with a relatively low dynamical range exposed to the incident light coming from the scene to be acquired. The image sensor has a plurality of photo-sensitive elements (photodetectors) arranged in a two-dimensional array and each sensitive element has a sensitivity level that is fixed according to a pre-established spatial distribution.

In practice, the image sensor has a pre-established spatially varying sensitivity pattern according to which the sensitivity level of each light-sensing element is established. The sensitivity of each light-sensing element is permanently fixed through masked etching steps when the image sensor is fabricated.

The main difference in respect to the solution of FIG. 2 consists in that there is not any optical mask interposed between the image sensor and the scene to be acquired, but the image sensor is composed of photo-sensitive elements of different sensitivity.

The published application WO 2005/024948 discloses a method for enhancing the dynamic range of a linear sensor of relatively low dynamic range by acquiring image pixel values with one of two different integration times, according to a pre-established spatial pattern, for example of the type depicted in FIG. 5.

The structure of the sensor described in the above identified publication has two buses or equivalent circuit means for controlling the pixel integration time according to a certain spatial pattern. With this technique luminous pixels of the image may be acquired with a shorter integration time and dark pixels with a longer integration time. It is thus possible to reconstruct an image of the scene that has a reduced number of saturated or dark pixels than the image that could be obtained with a single uniform integration time for all the pixels.

A drawback of this method consists in that the definition of the spatial pattern of the two different integration times heavily influences the quality of the reconstructed images. In particular, the integration time differences set for an image with a strong contrast may not be appropriate for acquiring an image of a significantly lighter contrast. Moreover, an erroneous choice of the spatial exposition pattern could make luminous zones of the image be acquired with a too long integration time and vice versa for the dark zones.

The U.S. Pat. No. 6,078,037 discloses an apparatus and a method for obtaining enhanced digital images. A light sensitive element such as a photo-diode is employed to sense a light level and a plurality of identical storage elements are associated with the sensitive element through configuration switches for charging the storage elements. The storage elements are connected in sequence to the light sensitive element by driving the switches with appropriate control phases. As an alternative, the control phases of the configuration switches may overlap partially to each other.

Drawbacks of this prior apparatus consist in that a dedicated logic circuitry may be needed for establishing the integration time of each storage element, and the intensity values are not taken simultaneously. Moreover, the charge characteristic of a certain storage element is modified at a certain instant and another storage element is connected electrically in parallel thereto.

BRIEF SUMMARY

A method, that may be implemented with a sensor of novel architecture that overcomes the drawbacks of the above-mentioned methods, based on adjusting the integration time of single pixels of the sensor depending on the light incident thereon, has now been found. According to one embodiment of the invention, the integration time of the photo-generated current at each pixel is individually adjusted.

According to an embodiment of the invention implemented with a relative sensor, the effective integration time (integration time of the generated current) of each pixel is adapted as a function of the incident light intensity by associating an "auto-exposure" circuit to each photo-detecting element (pixel) of the sensor.

It is even possible to associate to each pixel a dedicated circuit for selecting one among N pre-established current integration times.

Alternatively, it is possible, during a single exposure of a pre-established time, to charge simultaneously in parallel for a same integration time a plurality of charge accumulation cells of different capacitance, associated to each pixel photo-detector, such to permit to collect for each pixel of the exposed array of photo-detectors a plurality of different light intensity values.

Therefore, for each pixel one of a plurality of intensity values may be subsequently chosen for reconstructing a picture without dark or saturated pixels, in a way to maximize the signal-to-noise ratio (SNR) for example.

According to one embodiment of the invention, each photo-sensitive element is coupled to a single capacitor that is charged by the photo-generated current. The voltage level on the capacitor is repeatedly sampled at different instants for obtaining a plurality of intensity values for the same pixel captured for different integration times up to the maximum charge voltage value.

Whichever the alternative implemented, light intensity information captured for the single pixel is scaled in function of the respective (effective) integration time in a dynamic range larger than the intrinsic dynamic range capability of the photo-detectors of the sensor and the intensity values may be interpolated for generating a color RGB image, or an image in any other color format.

The so obtained color image of high dynamic range may be then eventually compressed using an appropriate tone mapping curve for displaying it according to a relatively limited dynamic range of the display.

According to another embodiment of the invention, pixels of same color are grouped in tetrads disposed according to a Bayer pattern, each photo-sensitive element of a tetrad being exposed with a respective effective exposure time. A single pixel with an intermediate effective exposure time is selected from each tetrad, intensities of the other image pixels of the tetrad are then scaled taking into account the respective integration times and eventually, saturated, dark or missing pixels are reconstructed through interpolation of the intensities of the neighboring pixels.

BRIEF DESCRIPTION OF THE SEVERAL VIEWS OF THE DRAWINGS

The patent or application file contains at least one drawing executed in color. Copies of the patent or patent application publication with color drawings will be provided by the Office upon request and payment of the necessary fee.

FIGS. 13a to 13c, 14a to 14c and 15a to 15c are analogous to FIGS. 12a to 12c;

DETAILED DESCRIPTION

Because of the preeminent use of the so-called Bayer pattern [See U.S. Pat. No. 3,971,065] in color image acquisition systems, reference will be made to Bayer images, though the principles that will be described hold mutatis mutandis for sensors using a different pattern for capturing color images.

Figure 6:
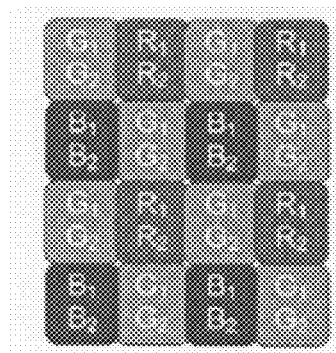
FIG. 6 depicts pixels of a Bayer pattern acquired according to one embodiment of the invention by adjusting the integration time of each of them independently from the integration time of the neighboring pixels.
Figure 7:
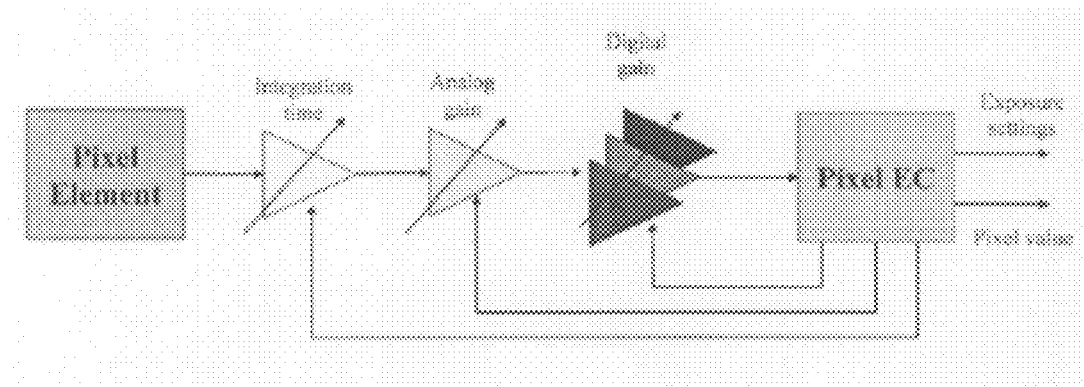
FIG. 7 depicts a first embodiment of the sensor according to one embodiment of the invention in which each sensitive element (pixel) has a respective "auto-exposure" circuit that fixes the integration time.
Figure 8A:
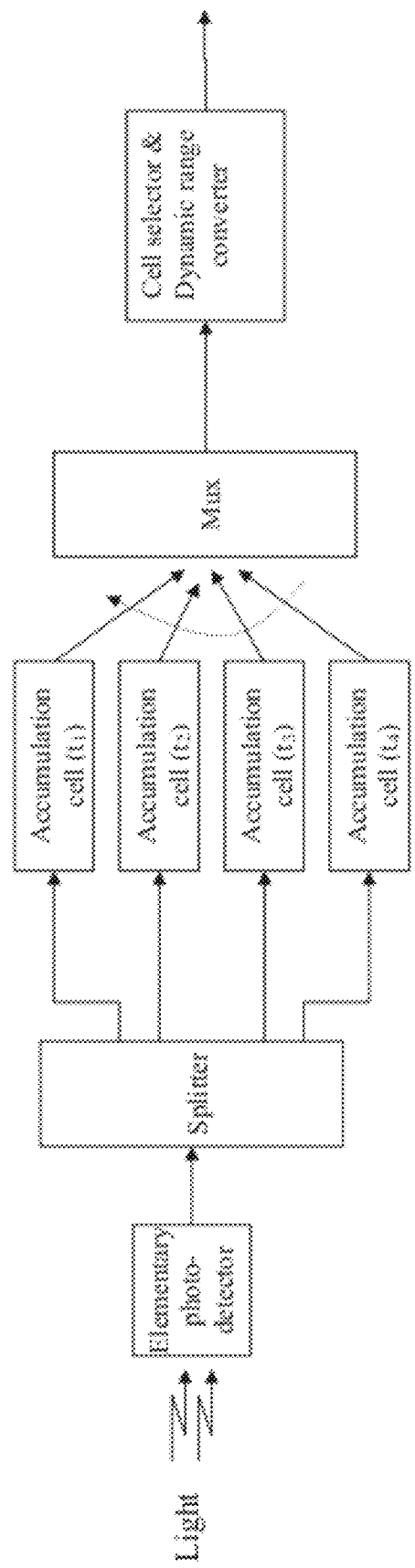
FIG. 8A depicts a second embodiment of the sensor according to one embodiment of the invention that has a circuit that establishes the integration time of each pixel by choosing it in a pre-established set of N values.
Figure 8B:
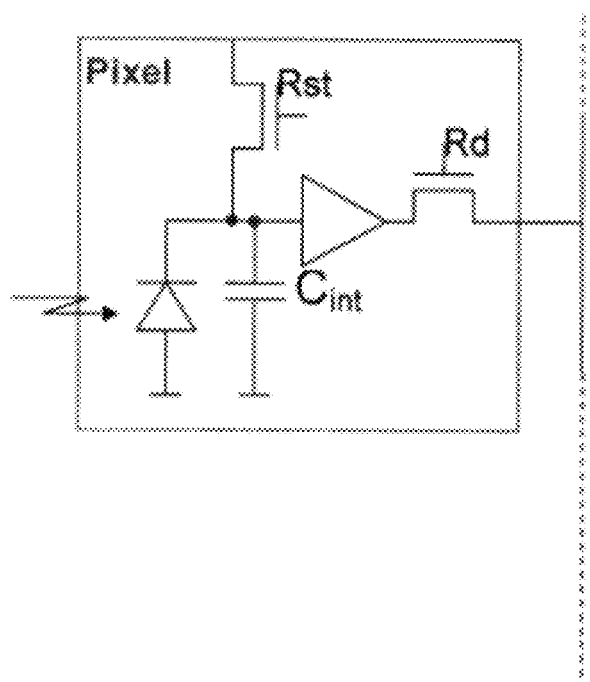
FIG. 8B depicts the circuit architecture of a pixel of the photo receiver of FIG. 8A.
Figure 8C:
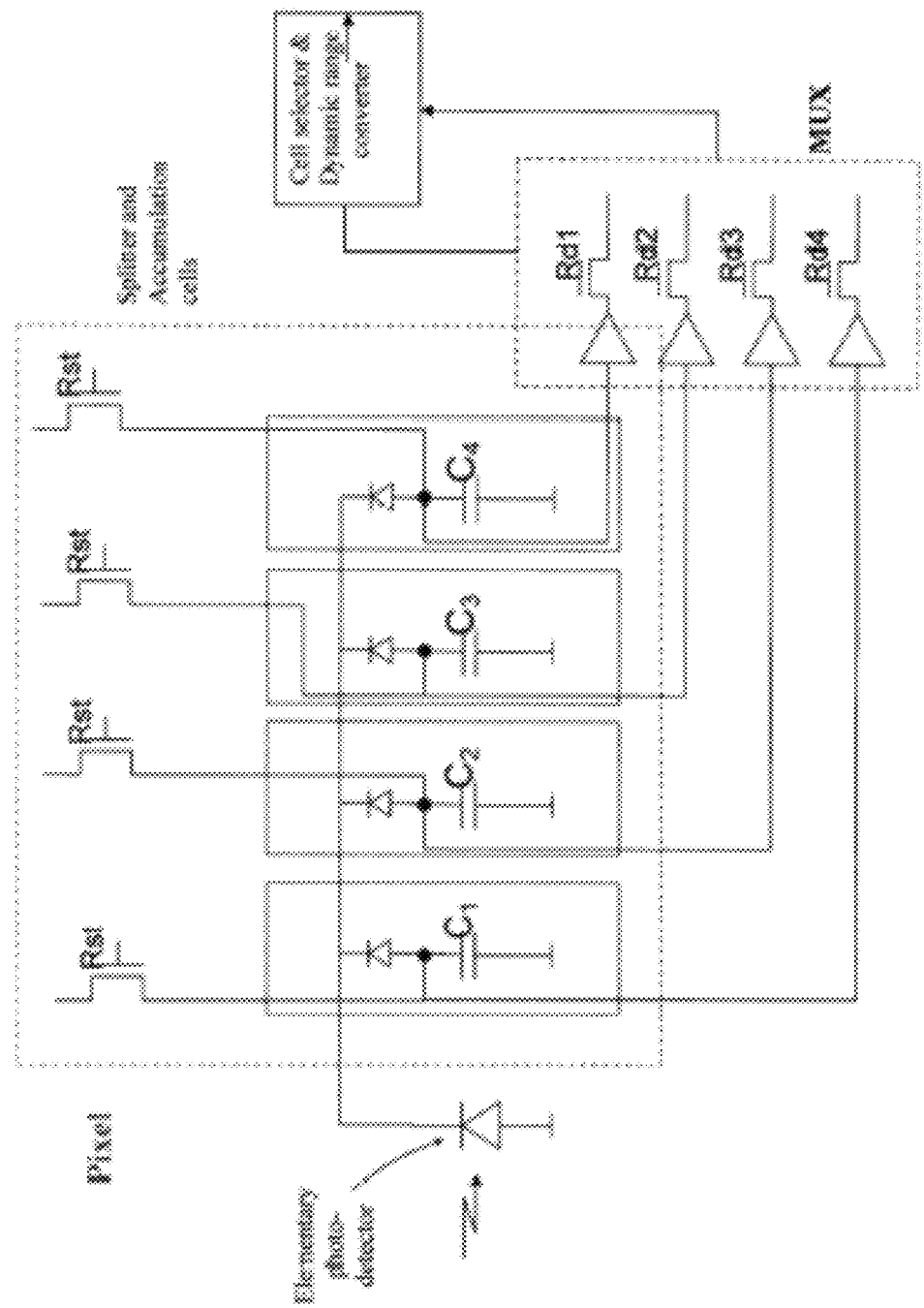
FIG. 8C depicts an embodiment of the block SPLITTER of FIG. 8A.

In FIG. 6, the most appropriate integration time is adjusted for each pixel independently from the integration times of neighboring pixels by associating to each pixel an auto-exposure adjustment circuit that may allow a continuous adjustment with a circuit as shown in FIG. 7 or a selection among a plurality of pre-fixed exposure times with a circuit as shown in FIGS. 8A-8C.

FIGS. 7 and 8A depict two possible embodiments of a pixel-wise logic control system of exposure of the sensor of this invention.

FIG. 7 shows a logic circuit like the one that is normally used at sensor level (that is a control of the sole exposure value of all sensitive elements), transposed at pixel level. The sensor includes an array of pixel elements each coupled to a respective integrator, an analog amplifier, digital color amplifiers, and a logic circuit (pixel EC). The logic circuit controls the integration time via the integrator, the gain via the analog amplifier, and the red, green, and blue color value via the digital color amplifiers, and outputs the exposure settings and the pixel value. For each pixel the most appropriate exposure is actuated thus preventing detection of saturated or black pixels.

FIG. 8A shows a basic architecture of an alternative embodiment of the sensor of this invention, in which the exposure for each pixel is post-selected by choosing through a switch (MUX) one among a number of selectable different integration times. This may be implemented by splitting (SPLITTER) the photo-generated electric current of an elementary photo-detector (corresponding to a pixel of the image) in identical sub-currents, each charging (or discharging) an identical capacitance of an accumulation cell (ACCUMULATION CELL) for different intervals of time ($t_1$, $t_2$, $t_3$, $t_4$). Of course, instead of different intervals of time, the capacitances may be made different and all be charged for the same interval of time.

FIG. 8B depicts a sample embodiment of a pixel elementary photo-detector. A photo-diode generates a current that represents the intensity of the impinging light; a capacitor Cint that is pre-charged to a known reference level through the switch Rst is discharged by the photo generated current with the switch Rst off. A buffer stage, for example a source follower stage, enabled by the switch Rd outputs an amplified replica of the voltage on the capacitor Cint that will represent the sensed light intensity.

According to a sense circuit approach as the one of FIG. 8B, a sample embodiment of a functionally equivalent circuit to the one of FIG. 8A is depicted in FIG. 8C.

The functioning of the depicted circuit will be immediately evident to any skilled person. The four capacitors C1-C4 may be identical or of different value and are precharged through the respective switches Rst1-Rst4. Upon exposing the sensor to the light from the scene, the photogenerated (reverse) current, of the elementary photo-detector of a pixel will discharge in parallel with different time constants the four pre-charged capacitors with all the respective pre-charge switches Rst1-Rst4 off. The most appropriate level of integration (effective exposure) for the pixel will be decided and selected through the output enabling switches Rd1-Rd4 of the MUX by the logic circuitry block CELL SELECTOR & DYNAMIC RANGE CONVERTER.

The block CELL SELECTOR & DYNAMIC RANGE CONVERTER reads one at the time the charge voltages of the capacitors, that in the depicted example are only four but may be even more numerous, by closing a corresponding selection switch Rd, and properly scales the intensity of each pixel in a different dynamic range as will be described hereinafter.

Without the need for repeated shootings of the same scene, according to one embodiment of this invention, an image is acquired such that each image pixel is represented by a plurality of values obtained at the same time but for different integration levels (effective exposures). For each pixel, a "representative" value is selected among those available, such that it is neither saturated or blackened. Preferably, the "representative" value is chosen to correspond also to the value that maximizes the signal-to-noise ratio (SNR). Such a two-fold selection may be carried out at least in part by the control logic circuitry associated to the pixel itself and/or in a successive image processing step. In the latter case, all the multiple values associated to each pixel are read from the sensor and transmitted to the processing unit.

Figure 9:
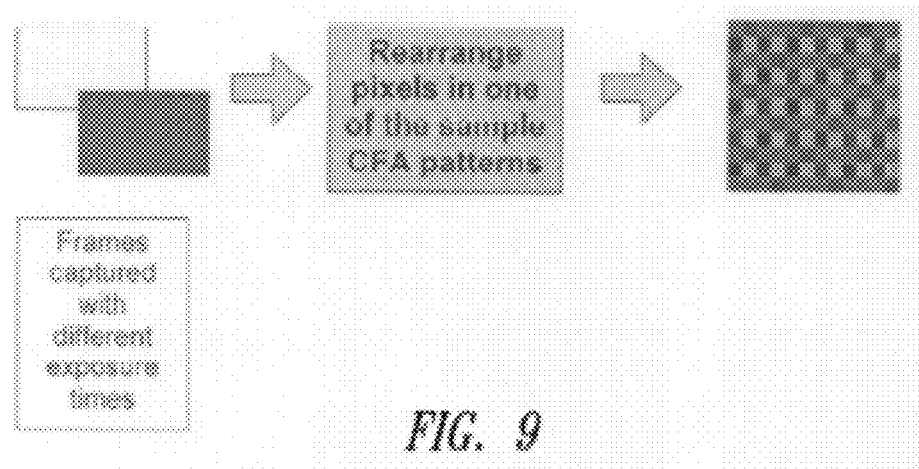
FIG. 9 depicts schematically how the sensor according to one embodiment of the invention generates a Bayer image in an extended dynamic range by combining pixels taken with different integration times.

Upon capturing a whole picture, each pixel thereof is scaled, as schematically illustrated in FIG. 9, to obtain a Bayer picture that substantially will be free of dark or saturated pixels and in which the intensities of the pixels are defined in a larger dynamic range than that of the physical sensor.

In practice, eventual saturated or dark pixel values are discarded and only pixel values comprised in the discriminated intensity range of the physical sensor are acquired and processed. The intensity of the pixels acquired with a low integration time $t_{low}$ (luminous pixels) smaller than the maximum integration time $t_{high}$ is multiplied by a factor equal to the ratio $t_{high}/t_{low}$, while the intensity of the pixels acquired with the maximum integration time $t_{high}$ (dark pixels) are not scaled. This results in an increment of the dynamic range of the image by the factor $t_{high}/t_{low}$.

The storage of digital values with a large dynamic range requires a large number of bits. To reduce memory size requirements, after the range conversion by $t_{high}/t_{low}$, the digital values can be compressed to a lower bit depth with an appropriate tone mapping curve.

Through a pipeline processing structure of any type as commonly used for the purpose, the Bayer picture of large dynamic range obtained according to one embodiment of the invention may be eventually processed into a correspondingly large dynamic range RGB image for displaying it.

Figure 10:
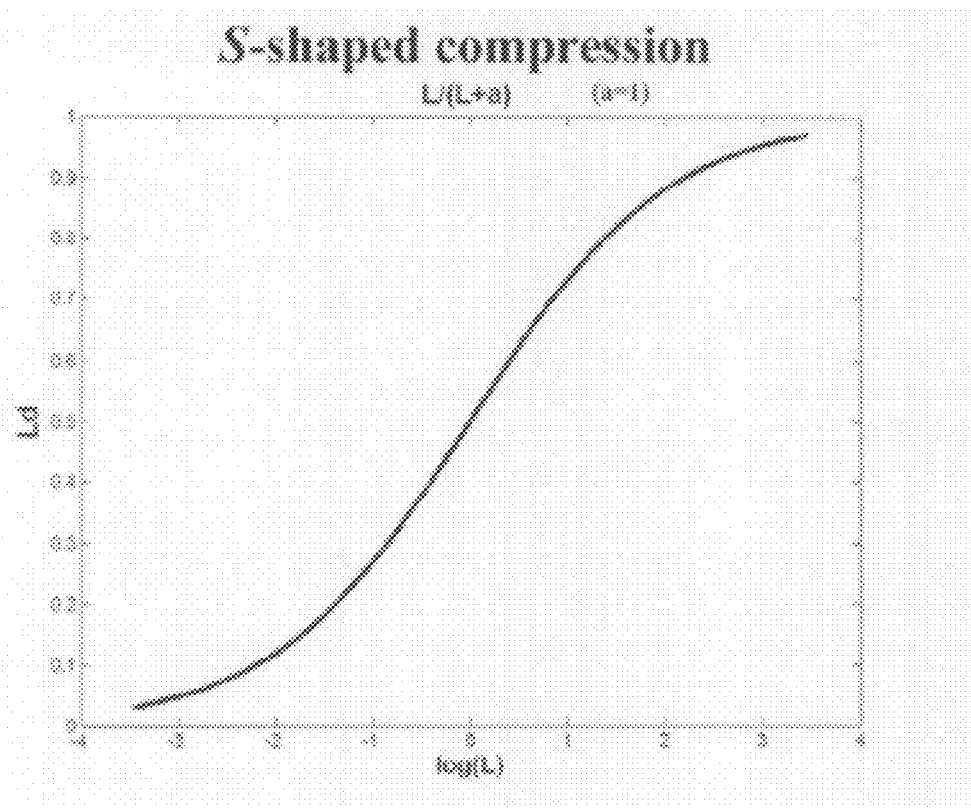
FIG. 10 depicts an S-shaped tone mapping compression curve of the intensities of image pixels in the high dynamical range for obtaining an 8-bit picture.

If the digital values were not compressed previously, the large dynamic range RGB image is compressed into an output image defined in a standard bit depth image representation (for example an 8 bit per color per image). This may be done by using the classic S-shaped compression curve, such as that depicted in FIG. 10, wherein:

$$Ld(x, y) = \frac{L(x, y)}{Ld(x, y) + 1}$$

L(x,y) being the intensity of the pixel (x,y). In practice, the luminance values L much smaller than 1 remain practically unchanged, while the values much larger than 1 are scaled by 1/L(x,y). Alternatively, other different mapping curves can be used for compressing the bit depth.

Figure 11A:
FIGS. 11a and 11b depict an image captured with a classic sensor that includes an "auto-exposure" circuit and the same image captured according to one embodiment of the invention, respectively.
Figure 11B:

FIG. 11A depicts a scene captured with a sensor provided with an "auto-exposure" circuit according to the prior art approach, while FIG. 11B depicts the same scene acquired with a sensor according to one embodiment of the invention that determines the integration time of each pixel. In this last figure, saturated or dark pixels are substantially absent and all the depicted objects are much more distinguishable.

Figure 12A:
FIGS. 12a, 12b and 12c are images captured with a short integration time, with a long integration time and according to one embodiment of the invention, respectively.
Figure 12B:
Figure 12C:
Figure 13A:
Figure 13B:
Figure 13C:
Figure 15A:
Figure 15B:
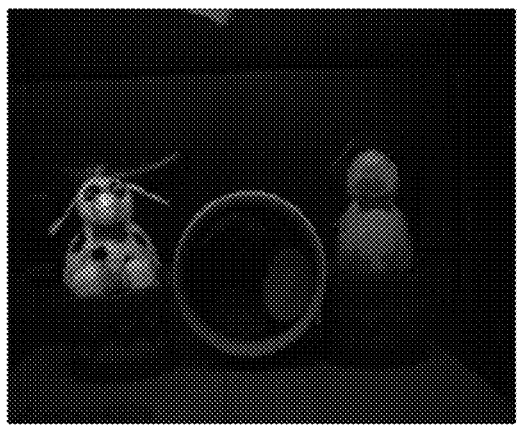
Figure 15C:

FIG. 12A depicts a scene captured with a short exposure and FIG. 12B depicts the same scene taken with a longer exposure. FIG. 12C depicts the same image obtained according to one embodiment of the invention by capturing luminous pixels with a shorter integration time and dark pixels with a longer integration time by scaling them in a large dynamic range and by compressing the image back to a reduced bit depth. In the depicted output image all objects inside the room are clearly visible and the landscape outside the window is recognizable, even if it is much more illuminated than the interior of the room.

Results of comparison tests similar to that of FIGS. 12A-12C are shown in FIGS. 13A-C, 14A-C, and 15A-C.

Figure 16:
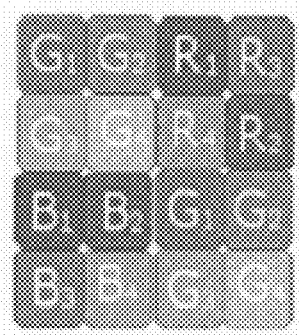
FIG. 16 depicts four tetrads of pixels of a same color organized according to a Bayer pattern used in one embodiment of the invention.

According to an embodiment of this invention, the elementary photo-detectors of the sensor are grouped in tetrads of pixels, the tetrads being disposed according to a Bayer pattern as depicted in FIG. 16 and each pixel of a tetrad is captured with a respective pre-established integration time (indicated by the subscript). Among the four pixels of each tetrad, a pixel of intermediate value is chosen and the other pixels are discarded. In this case, the resolution of the output image is ¼ the resolution of the sensor.

Figure 1:
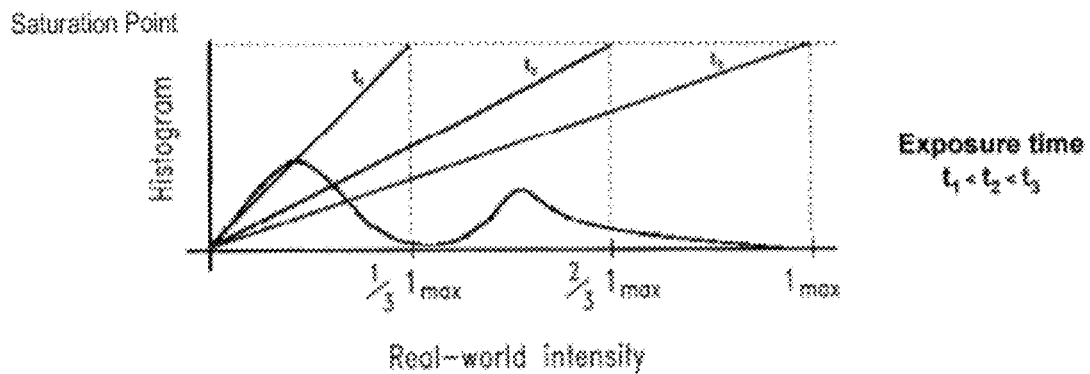
FIG. 1 illustrates the portion of real scene that can be acquired by a linear sensor for various exposure times and with a fixed saturation point.
Figure 2:
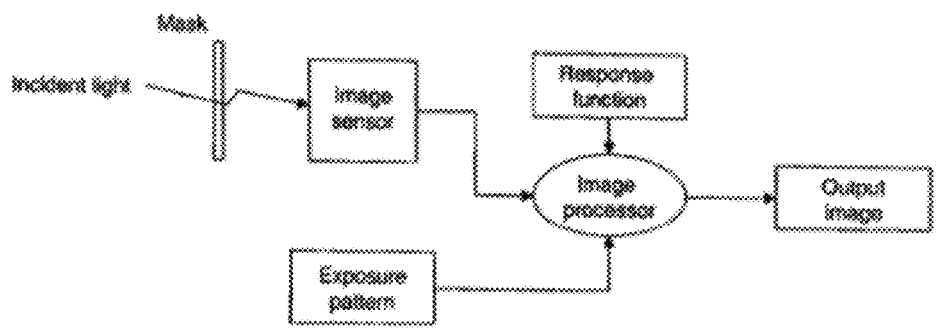
FIG. 2 depicts a basic architecture of the sensor disclosed by Nayar [1] that comprises an optical mask that filters the light coming from the scene.
Figure 3:
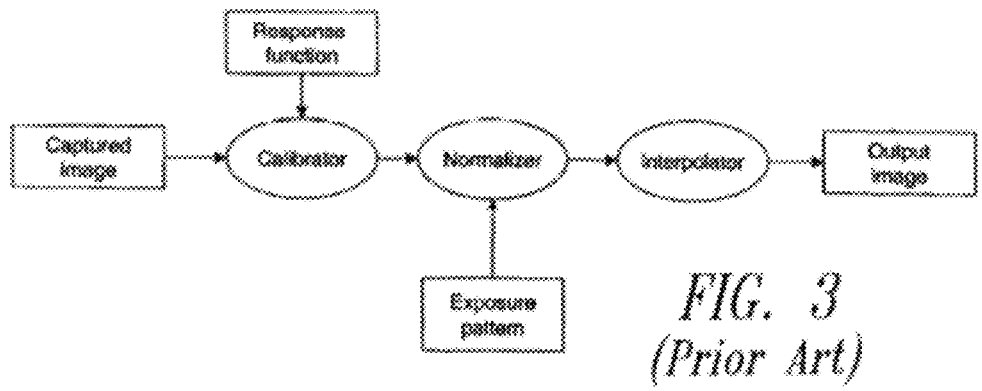
FIG. 3 depicts the sequence of operations of the method disclosed by Nayar [1]
Figure 4:
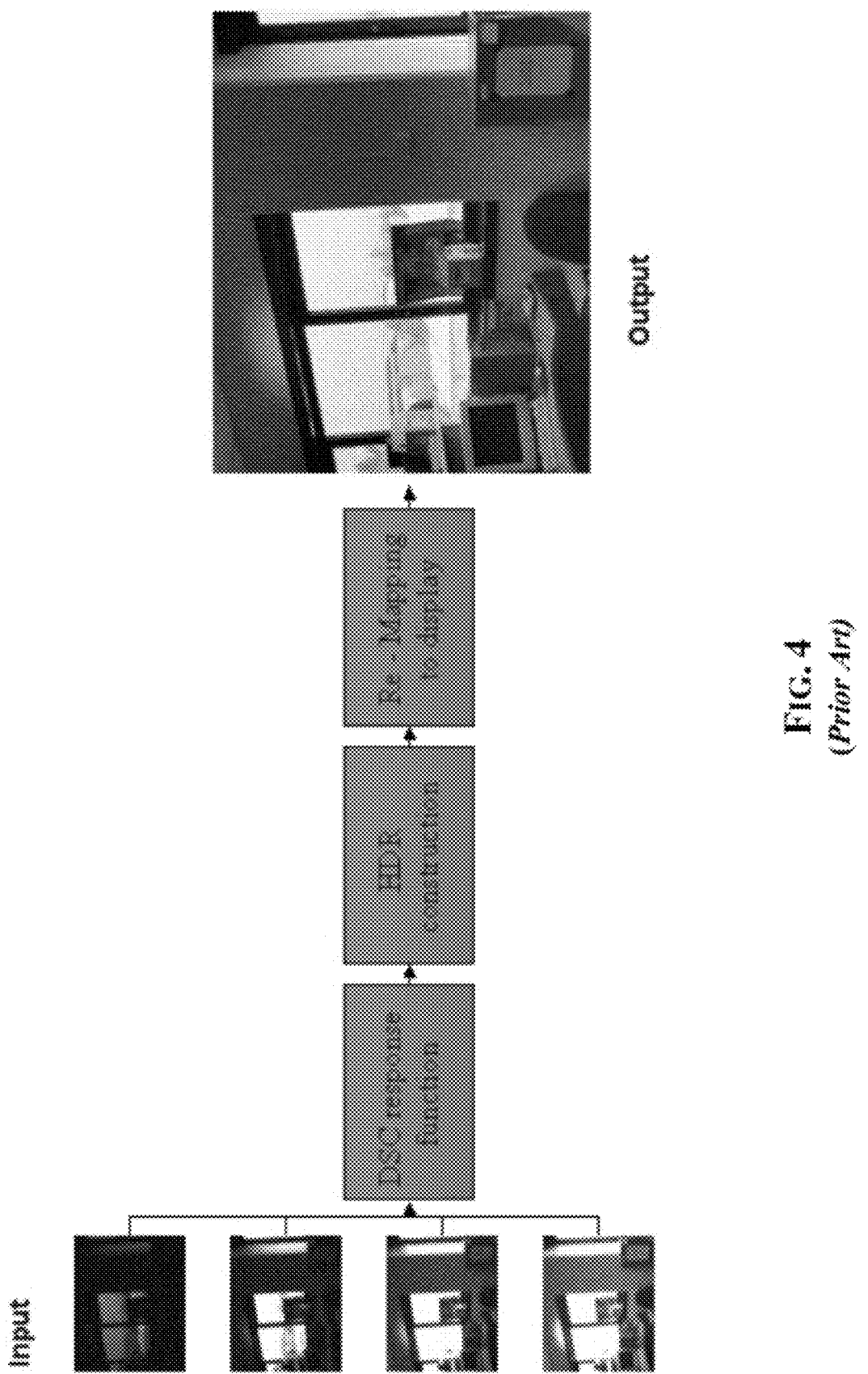
FIG. 4 illustrates a known method for generating images with high dynamic range by using a plurality of pictures reproducing the same scene taken with different integration times.
Figure 5:
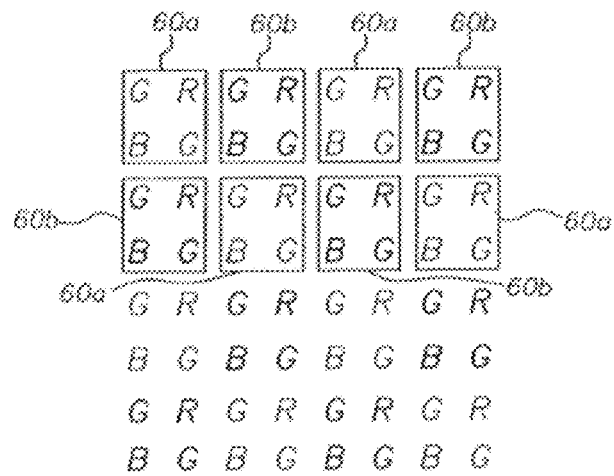
FIG. 5 depicts a Bayer pattern in which pixels are acquired with two different integration times distributed according to a checkerboard pattern, disclosed in prior PCT application WO 2005/024948.
Figure 17:
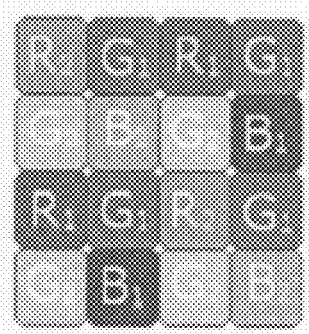
FIG. 17 depicts a particularly effective spatial distribution of time exposures of photo-sensitive elements of a Bayer pattern used in one embodiment of the invention.

According to another alternative embodiment of this invention, the elementary photo-detectors of the sensor are disposed according to a Bayer pattern as depicted in FIG. 17. This pattern is analogous to that of FIG. 5 of the above mentioned prior application WO 2005/024948, but it has been found that the performances obtainable using the pattern of FIG. 17 are significantly better than those obtainable with the pattern of FIG. 5 of the prior application.

This unexpected result is probably due to the fact that in any 2×2 group of pixels there are at least two pixels of different integration times. Therefore, if the integration time 1 provides better results than the integration time 2, with the depicted pattern according to one embodiment of this invention it is always possible to select a pixel intensity with the most appropriate integration time. This is particularly useful for preserving borders in textured images.

Figure 18:
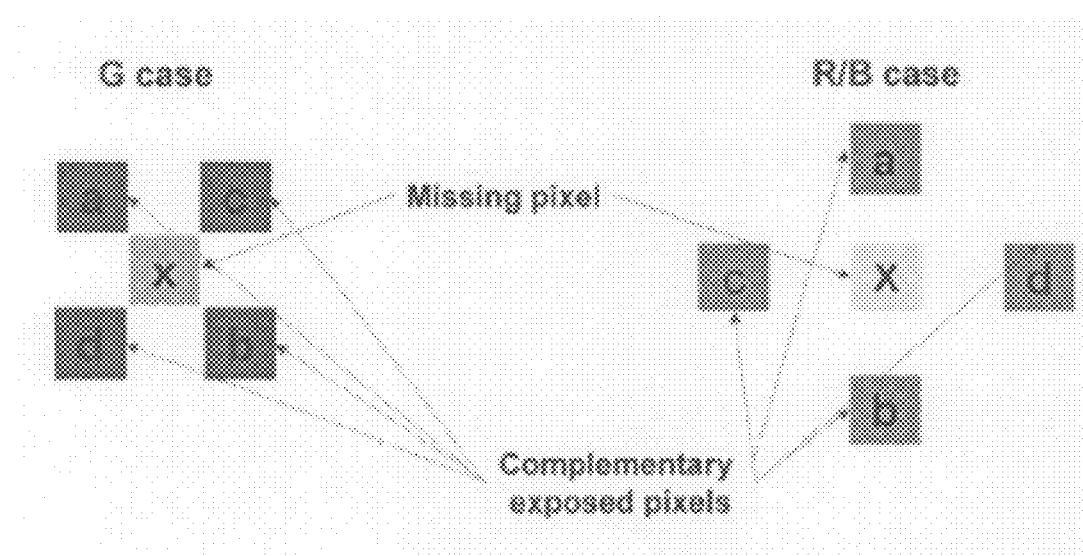
FIG. 18 is a basic illustration of an interpolation technique for calculating the intensities of missing pixels.
Figure 19:
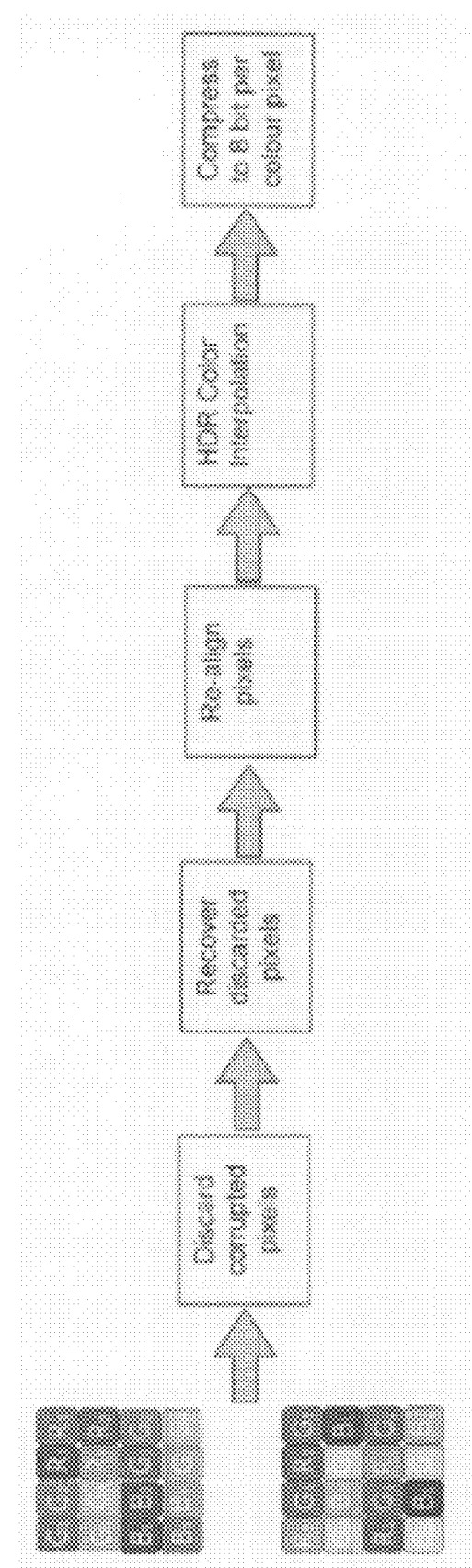
FIG. 19 illustrates the method steps of an embodiment of the invention that uses the Bayer patterns of FIGS. 16 and 17.

A block diagram that illustrates how an interpolated RGB picture is obtained according to one embodiment of the invention using the patterns of FIGS. 16 and 17 is depicted in FIG. 19. From the obtained Bayer image, dark or saturated pixels are discarded and are reconstructed through an interpolation technique based on the intensity of the neighboring pixels of the same color, as schematically shown in FIG. 18. Then the method continues as previously illustrated, through the steps of generating a Bayer image of enlarged dynamic range, obtaining a corresponding RGB image of large dynamic range and compressing the so-obtained RGB image in a standard format of reduced bit depth (for example 8 bits).

An advantage of this technique consists in that it is not necessary to associate to each sensitive element (pixel) an auto-exposure circuit thus reducing hardware overhead. By contrast, the sampling instants for each tetrad are at most four and it is necessary to reconstruct the missing pixels for obtaining a Bayer image with a large dynamic range.

REFERENCES

[1] Nayar, Mitsunaga, "Apparatus and Method for High Dynamic Range Imaging Using Spatially Varying Exposures", International Publication Number WO 00/79784
[2] Nayar, Mitsunaga, "Method and Apparatus for Obtaining High Dynamic Range Images", International Publication Number WO 01/63914
[3] Nayar, S. K.; Mitsunaga, T; "*High dynamic range imaging: spatially varying pixel exposures*"; Computer Vision and Pattern Recognition, 2000. Proceedings. IEEE Conference on, Volume 1, 13-15 June 2000 Page(s):472-479 vol. 1.
[4] Nayar, S. K.; Branzoi, V.; "*Adaptive dynamic range imaging: optical control of pixel exposures over space and time*", Computer Vision, 2003 Proceedings Ninth IEEE International Conference on 13-16 Oct. 2003 Page(s): 1168-1175 vol. 2.
[5] Shree K. Nayar and Srinivasa G. Narasimhan; "*Assorted Pixels: Multi-Sampled Imaging With Structural Models*", Proc. of European Conference on Computer Vision (ECCV) Copenhagen, May 2002.
[6] B. E. Bayer, "Color Imaging Array", U.S. Pat. No. 3,971,065—1976.
[7] Booth J. Lawrence, "Active pixel CMOS sensor with multiple storage capacitors", U.S. Pat. No. 6,078,037.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image sensor comprising:
   an array of photo-sensitive pixel elements each structured to produce an electrical quantity from light incident on the pixel element;
   a plurality of generation circuits coupled respectively to a plurality of the pixel elements, each generation circuit being configured to generate a plurality of charge voltages from the electrical quantity produced by the pixel element to which the generation circuit is coupled; and
   a plurality of decision circuits respectively coupled to the generation circuits, each decision circuit being configured to select a representative charge voltage from the plurality of charge voltages generated by the generation circuit to which the decision circuit is coupled.

2. The image sensor of claim 1, wherein:
   for each pixel element, the electrical quantity is a current representative of an intensity of light incident on the pixel element; and each generation circuit includes a plurality of integrating capacitors coupled to the pixel element to which the generation circuit is coupled, each integrating capacitor being configured to be charged or discharged by the current produced by the pixel element to which the generation circuit is coupled.

3. The image sensor of claim 2, wherein:
each generation circuit further includes a plurality of voltage sampling circuits respectively coupled to corresponding integrating capacitors of the integrating capacitors of the generation circuit, each voltage sampling circuit being configured to repeatedly sample a voltage on the corresponding integration capacitor at selected time intervals from an instant in which the sensor is exposed to the incident light, the voltage sampling circuits being configured to output voltage values representative of light intensity values captured by the pixel element, to which the generation circuit is coupled, at different integration times.

4. The image sensor of claim 3, wherein each decision circuit is configured to choose a sampled voltage that lies at a middle of a dynamic range of said photo-sensitive pixel elements.

5. The image sensor of claim 2, wherein:
wherein within each generation circuit, the integrating capacitors having different capacitances and the generation circuit is configured to charge the capacitors of the generation circuit for a same time interval.

6. The image sensor of claim 2, wherein each decision circuit is configured to select, as the representative charge voltage, whichever charge voltage output by one of the integrating capacitors maximizes a signal-to-noise ratio of the pixel element to which the integrating capacitor is coupled.

7. The image sensor of claim 1, wherein each generation circuit includes:
an integrating capacitor; and
an auto-exposure circuit structured to individually control an integration time of the integrating capacitor.

8. The image sensor of claim 1, wherein:
the pixel elements of the array are grouped in tetrads of pixels of a same color each exposed to incident light, the tetrads being arranged according to a Bayer pattern, each pixel element generating a current representative of an intensity of the light incident on the pixel element; and
the plurality of generation circuits includes groups of generation circuits respectively coupled to the tetrads, each group including generation circuits respectively coupled to the pixel elements of the tetrad, wherein for each group, each generation circuit of the group includes a corresponding integrating capacitor and is configured to charge or discharge the corresponding integrating capacitor for a respective integration time by the current produced by a corresponding pixel element of the tetrad to which the group is coupled.

9. The image sensor of claim 8, wherein the plurality of decision circuits includes decision circuits respectively associated with the tetrads of pixel elements, each decision circuit being structured to select for the tetrad with which the decision circuit is associated, a charge voltage of one of the integrating capacitors coupled to said tetrad that lies at a middle of a dynamic range of the sensor.

10. The image sensor of claim 1 wherein:
the image sensor is a color image sensor;
the pixel elements of the array are arranged according to a Bayer pattern, each pixel element being configured to generate a current representative of an intensity of the light incident on the pixel element; and
each generation circuit includes an integrating capacitor coupled to the pixel element to which the generation circuit is coupled, each integrating capacitor being charged or discharged by the current generated by the pixel according to a respective integration time that is selected to be equal to either a first or a second exposure value, such that in any group of 2×2 photo-sensitive pixel elements of the array there are always two green pixels acquired with different integration times.

11. The image sensor of claim 1 wherein:
the image sensor is a color image sensor;
the pixel elements of the array are arranged according to a Bayer pattern, each pixel element being configured to generate a current representative of an intensity of the light incident on the pixel element; and
each generation circuit includes an integrating capacitor coupled to the pixel element to which the generation circuit is coupled, each integrating circuit being charged or discharged by the current generated by the pixel according to a respective integration time that is selected to be equal to either a first or a second exposure value, such that there is at least a group of 2×2 photo-sensitive elements including three photo-sensitive elements having the first exposure value and one photo-sensitive element having the second exposure value.

12. A method, comprising:
capturing an image with an image sensor having a plurality of pixels, the capturing including individually adjusting an integration time of each pixel of the plurality depending on light incident on the pixel wherein:
said image sensor comprises, for each e a capacitor charged by a photo-sensitive pixel element of the pixel; and
the adjusting step includes, for each pixel:
generating a plurality of sampled voltage values by repeatedly sampling a voltage on the respective pixel capacitor at different instants from a first instant of exposure of the sensor to the light and
choosing whichever sampled voltage value maximizes a signal-to-noise ratio of the sensor, among said plurality of sampled voltage values.

13. A method, comprising:
capturing an image with an image sensor having a plurality of pixels, the capturing including individually adjusting an integration time of each pixel of the plurality depending on light incident on the pixel, wherein:
said image sensor comprises, for each pixel, a plurality of capacitors; and
adjusting the integration time of each pixel including for each pixel:
charging or discharging the capacitors coupled to the pixel for a respective integration time starting from an activation instant of the sensor; and
choosing a voltage value on the capacitors coupled to the pixel, that maximizes a signal-to-noise ratio of the sensor.

14. A method, comprising:
capturing an image with an image sensor having a plurality of pixels, the capturing including individually adjusting an integration time of each pixel of the plurality depending on light incident on the pixel;
grouping the pixels of the sensor in tetrads of a same color, the tetrads being arranged according to a Bayer pattern;
wherein the adjusting includes:
fixing a same integration time for corresponding pixels of different tetrads;

fixing different integration times for the photo-sensitive elements of a same tetrad; and selecting for each tetrad one light intensity value captured by a pixel of the tetrad, that maximizes a signal-to-noise ratio of the sensor.

15. A method, comprising:

capturing an image with an image sensor having a plurality of pixels, the capturing including individually adjusting an integration time of each pixel of the plurality depending on light incident on the pixel: and arranging the pixels of the sensor according to a Bayer pattern; wherein the adjusting includes:

fixing the integration time for each pixel equal to a first or a to a second exposure value, such that in any group of 2×2 pixels there are two green pixels acquired with different integration times.

16. A method, comprising:

capturing an image with an image sensor having a plurality of pixels, the capturing including individually adjusting an integration time of each pixel of the plurality depending on light incident on the pixel; and arranging the pixels of the sensor according to a Bayer pattern; wherein the adjusting includes:

fixing the integration time for each pixel equal to a first or a second exposure value, such that there is at least a group of 2×2 pixels in which there are three pixels having the first exposure value and a sole pixel having the second exposure value.

17. The method of claim 16 wherein the image is a first image, the method further comprising:

generating a second image by discarding eventual blackened or saturated or corrupted pixels of the first image;

generating a third image by estimating a value of discarded or missing pixels as a function of an intensity of neighboring pixels of a same type; and outputting a high quality digital image by carrying out a color interpolation step on said third image.

18. An image sensor, comprising:

an array of photo-sensible pixel elements each pixel element being configured to generate a current representative of an intensity of incident light and to charge a respective integrating capacitor coupled to the element; and plurality of auto-exposure circuits associated respectively with the photo-sensible pixel elements, each auto-exposure circuit being structured to individually control an integration time of the pixel element with which the auto-exposure circuit is associated, wherein:

said pixel elements are arranged according to a Bayer pattern;

the integration time of each pixel element is selected to be equal to either a first or a second exposure value, such that in any group of 2×2 pixel elements, there are always two green pixel elements configured with different integration times.

19. The image sensor of claim 18, wherein the plurality of auto-exposure circuits include:

a plurality of generation circuits coupled respectively to a plurality of the pixel elements, each generation circuit being configured to generate a plurality of charge voltages from the electrical quantity produced by the pixel element to which the generation circuit is coupled; and a plurality of decision circuits respectively coupled to the generation circuits, each decision circuit being configured to select a representative charge voltage from the plurality of charge voltages generated by the generation circuit to which the decision circuit is coupled.

20. The image sensor of claim 19, wherein:

for each pixel element, the electrical quantity is a current representative of an intensity of light incident on the pixel element; and each generation circuit includes a plurality of integrating capacitors coupled to the pixel element to which the generation circuit is coupled, each integrating capacitor being configured to be charged or discharged by the current produced by the pixel element to which the generation circuit is coupled.

21. The image sensor of claim 20, wherein:

each generation circuit further includes a plurality of voltage sampling circuits respectively coupled to corresponding integrating capacitors of the integrating capacitors of the generation circuit, each voltage sampling circuit being configured to repeatedly sample a voltage on the corresponding integration capacitor at selected time intervals from an instant in which the sensor is exposed to the incident light, the voltage sampling circuits being configured to output voltage values representative of light intensity values captured by the pixel element, to which the generation circuit is coupled, at different integration times.

22. The image sensor of claim 21, wherein each decision circuit is configured to choose a sampled voltage that lies at a middle of a dynamic range of said photo- sensitive pixel elements.

23. An image sensor, comprising:

an array of photo-sensible pixel elements, each pixel element being configured to generate a current representative of an intensity of incident light and to charge a respective integrating capacitor coupled to the element; and a plurality of auto-exposure circuits associated respectively with the photo-sensible pixel elements, each auto-exposure circuit being structured to individually control an integration time of the pixel element with which the auto-exposure circuit is associated, wherein:

said pixel elements are arranged according to a Bayer pattern;

the integration time of each pixel element is selected to be equal to either a first or a second exposure value, such that there is at least a group of 2×2 pixel elements including three pixel elements having the first exposure value and one pixel element having the second exposure value.

24. The image sensor of claim 23, wherein the plurality of auto-exposure circuits include:

a plurality of generation circuits coupled respectively to a plurality of the pixel elements, each generation circuit being configured to generate a plurality of charge voltages from the electrical quantity produced by the pixel element to which the generation circuit is coupled; and a plurality of decision circuits respectively coupled to the generation circuits, each decision circuit being configured to select a representative charge voltage from the plurality of charge voltages generated by the generation circuit to which the decision circuit is coupled.

25. The image sensor of claim 24, wherein:

for each pixel element, the electrical quantity is a current representative of an intensity of light incident on the pixel element; and each generation circuit includes a plurality of integrating capacitors coupled to the pixel element to which the generation circuit is coupled, each integrating capacitor being configured to be charged or discharged by the current produced by the pixel element to which the generation circuit is coupled.

26. The image sensor of claim 25, wherein:
each generation circuit further includes a plurality of voltage sampling circuits respectively coupled to corresponding integrating capacitors of the integrating capacitors of the generation circuit, each voltage sampling circuit being configured to repeatedly sample a voltage on the corresponding integration capacitor at selected time intervals from an instant in which the sensor is exposed to the incident light, the voltage sampling circuits being configured to output voltage values representative of light intensity values captured by the pixel element, to which the generation circuit is coupled, at different integration times.

27. The image sensor of claim 26, wherein each decision circuit is configured to choose a sampled voltage that lies at a middle of a dynamic range of said photo-sensitive pixel elements.

* * * * *

UNITED STATES PATENT AND TRADEMARK OFFICE
CERTIFICATE OF CORRECTION

PATENT NO.         : 8,102,435 B2
APPLICATION NO.    : 11/857315
DATED              : January 24, 2012
INVENTOR(S)        : Alfio Castorina et al.

It is certified that error appears in the above-identified patent and that said Letters Patent is hereby corrected as shown below:

Item (75):
"Alfio Castorina, Linera (IT); Alessandro Capra, Gravina de Catania (IT)" should read,
--Alfio Castorina, Linera (IT); Alessandro Capra, Gravina di Catania (IT)--.

Item (56):
"Reinhard et al., "High Dynamic Range Imaging, Acquisition, Display, and Image Based Lighting," Morgan Kaufmann Publishers, Inc., Nov. 2005, pp. 115-118, 136-139, 187-190, and 206-209." should read, --Reinhard et al., "High Dynamic Range Imaging, Acquisition, Display, and Image-Based Lighting," Morgan Kaufmann Publishers, Inc., Nov. 2005, pp. 115-118, 136-139, 187-190, and 206-209.--.

Column 10, Lines 29-30:
"depending on light incident on the pixel wherein:" should read, --depending on light incident on the pixel, wherein:--.

Column 10, Line 31:
"said image sensor comprises, for e a capacitor" should read, --said image sensor comprises, for each pixel, a capacitor--.

Column 10, Line 38:
"instant of exposure of the sensor to the light and" should read, --instant of exposure of the sensor to the light; and--.

Column 11, Lines 9-10:
"depending on light incident on the pixel: and" should read, --depending on light incident on the pixel; and--.

Signed and Sealed this
Tenth Day of April, 2012

David J. Kappos
*Director of the United States Patent and Trademark Office*

Column 11, Lines 39-40:
"an array of photo-sensible pixel elements each pixel element being" should read, --an array of photo-sensible pixel elements, each pixel element being--.